PATTERN RECOGNITION SYSTEMS

Filed Jan. 12, 1961

4 Sheets-Sheet 1

Inventor:
Leonard G. Abraham, Jr.,
by John P. Dellitt
His Attorney.

Oct. 19, 1965 L. G. ABRAHAM, JR 3,213,421

PATTERN RECOGNITION SYSTEMS

Filed Jan. 12, 1961 4 Sheets-Sheet 2

Inventor:
Leonard G. Abraham, Jr.,
by John P. Dellitt
His Attorney.

Fig.5
| | μ λ η ξ ∈ δ γ β α |
|---|---|
| A (60) | 1 1 1 1 1 (0 0 0 0) |
| A (69) | 0 0 1 1 0 |
| B | 1 0 1 1 1 (0 0 0 0) |
| | 0 0 1 0 0 |
| C | 0 1 0 1 0 (0 0 0 0) |
| | 0 0 1 0 0 |
| D | 1 0 1 (0 0 0 0 0 0) |
| | 0 0 0 |
| E | 1 1 1 1 1 1 1 1 1 |
| | 0 0 1 1 0 1 1 0 0 |
| F | 1 1 1 1 1 1 1 (0 0) |
| | 0 0 1 1 0 1 0 |
| G | 0 1 0 1 1 1 1 1 0 |
| | 0 0 1 1 1 0 0 0 0 |
| H | 1 1 1 1 1 1 1 1 (0) |
| | 0 1 1 0 0 1 1 0 |
| I | 1 1 (0 0 0 0 0 0 0) |
| | 0 0 |
| J | 1 0 1 0 (0 0 0 0 0) |
| | 0 0 0 1 |
| K | 1 1 1 1 1 1 1 1 (0) |
| | 0 1 0 1 0 1 1 0 |
| L | 1 1 1 1 (0 0 0 0 0) |
| | 0 1 0 0 |
| M | 1 1 1 1 1 1 1 1 (0) |
| | 0 1 0 0 1 0 1 0 |
| N (60) | 1 1 1 1 1 1 (0 0 0) |
| N (69) | 0 1 0 0 1 0 |
| O | 0 (0 0 0 0 0 0 0 0) |
| | 0 |
| P | 1 0 1 1 (0 0 0 0 0) |
| | 0 0 1 0 |
| Q | 0 1 1 1 0 (0 0 0 0) |
| | 0 1 0 1 0 |
| R | 1 0 1 1 1 1 1 (0 0) |
| | 0 0 1 0 1 1 0 |
| S | 0 1 0 0 1 0 0 (0 0) |
| | 0 0 1 0 0 1 0 |
| T | 1 1 1 1 1 (0 0 0 0) |
| | 1 0 0 1 0 |
| U | 1 0 1 0 (0 0 0 0 0) |
| | 0 1 0 0 |
| V | 1 1 1 1 (0 0 0 0 0) |
| | 0 1 0 0 |
| W | 1 1 1 1 1 1 1 1 (0) |
| | 0 1 0 1 0 0 1 0 |
| X | 1 1 1 1 1 1 1 1 (0) |
| | 0 1 0 1 0 1 0 1 |
| Y | 1 1 1 1 1 1 (0 0 0) |
| | 0 1 0 1 0 1 |
| Z | 1 1 1 1 1 1 (0 0 0) |
| | 1 0 0 1 0 0 |
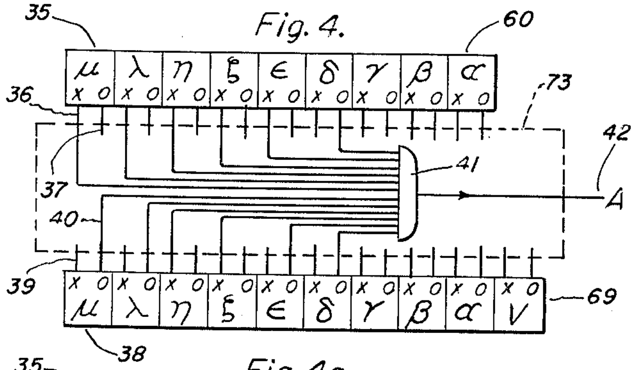
Fig. 4.
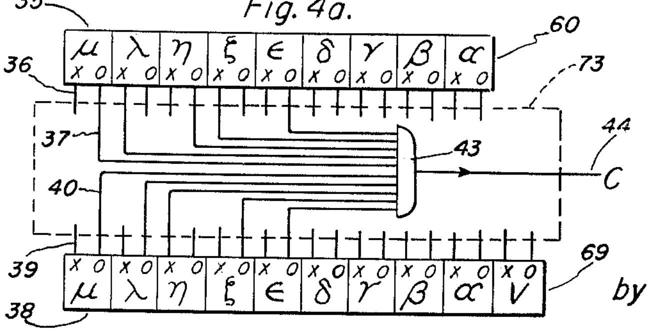
Fig. 4a.
Inventor:
Leonard G. Abraham, Jr.,
by John P. [signature]
His Attorney.

Inventor:
Leonard G. Abraham, Jr.,
by John P. Dellaff
His Attorney.

United States Patent Office 3,213,421

Patented Oct. 19, 1965

3,213,421
PATTERN RECOGNITION SYSTEMS

Leonard G. Abraham, Jr., Ballston Lake, N.Y., assignor to General Electric Company, a corporation of New York Filed Jan. 12, 1961, Ser. No. 82,212
12 Claims. (Cl. 340—146.3)

This invention relates to pattern recognition systems and more particularly such systems applicable for uniquely differentiating alpha-numeric characters from one another.

Prior character recognition systems have varied considerably in their individual construction but have a number of characteristics in common. Many such systems depend to a large degree upon the correlation of shapes, i.e., pattern matching, wherein a letter or certain characteristics thereof are compared with a set of stored information, for example, wherein a letter is compared with optical masks representative of a range of characters or certain elements of letters. Other systems compare one portion of an observed character with other portions thereof as seen by a raster formation. Prior systems are dependent to some degree upon the correct registration of the character in comparison to the stored information or raster formation. Therefore such systems leave opportunity for error in misdetecting character elements viewed, and full and complete electrical definition of the character read is difficult to achieve in the subsequent circuitry.

Considering each alpha-numeric character as a geometric pattern or figure, it is proposed such character or figure is completely defined by the interconnecting line segments and curves composing it. A system recognizing each segment of each letter together with the characteristics thereof will completely and unfailingly define and distinguish the characters one from another in the same manner and with nearly the same accuracy as the human observer. This type of geometrical recognition should be largely independent of mis-orientation or mis-registration of the character recognized. Moreover, such recognition will be somewhat independent of the type font employed to the degree that different fonts represent the same geometric pattern.

It is therefore an object of the present invention to provide an improved character recognition system capable of registering the geometrical characteristics of each such character.

It is another object of the present invention to provide an improved charcater recognition system which is independent of internal sampling means, matching means, and the like and which is responsive to the complete geometric pattern of the character to uniquely define that character.

It is a further object of this invention to provide an improved character recognition system which is relatively independent of character registration and to a large degree independent of rotational mis-orientation.

In accordance with the specific embodiment of the present invention, a character or figure is completely recognized by completely tracing the outline of such figure and registering its vertices, its line segments, its curved segments and the directions taken by such line segments and curves. A quaternary code is developed for unique definition of each letter which may comprise for example, a pair of binary codes wherein each pair of digits represents an element of the character. One binary code may then state whether an element is a vertex or a curve while the other binary code states whether the outline trace either turned or curved to the right or left. Such system completely defines a set of characters in terms of its own geometric patterns and each character may be reconstructed or easily recognized in this coded representation.

In accordance with a feature of the invention an electrical signal $\dot{\theta}$ is developed which is the angular velocity or angular change in direction of the character outline as one traces around the character. Such $\dot{\theta}$ signal becomes rapidly positive as a character segment turns in a first direction at a vertex while becoming rapidly negative if the character turns in the opposite direction at the vertex. Moreover, such signal, $\dot{\theta}$, when integrated will produce a value increasing steadily in a first polarity direction for a curvature in a first direction and will increase steadily in the opposite polarity direction for a curvature in the opposite direction. All such features characteristic of the geometric shape of the character may be stored conveniently for detection at the conclusion of each trace.

In practicing my invention in its broader aspects it will occur to those skilled in the art that complete geometric representation of a character in electrical form may utilize varied circuit elements. Moreover, it is frequently possible to delete portions of a complete electrical outline of a character and still choose between one character and another in a limited set of characters. It is to be understood, however, that the present invention employs the principle of defining these geometric characteristics in themselves in the sequence in which they appear in the letter and with a coding completely representative of the geometric elements of the character without relying upon a stored version of the character with which the said character is to be matched.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figures 1, 2:
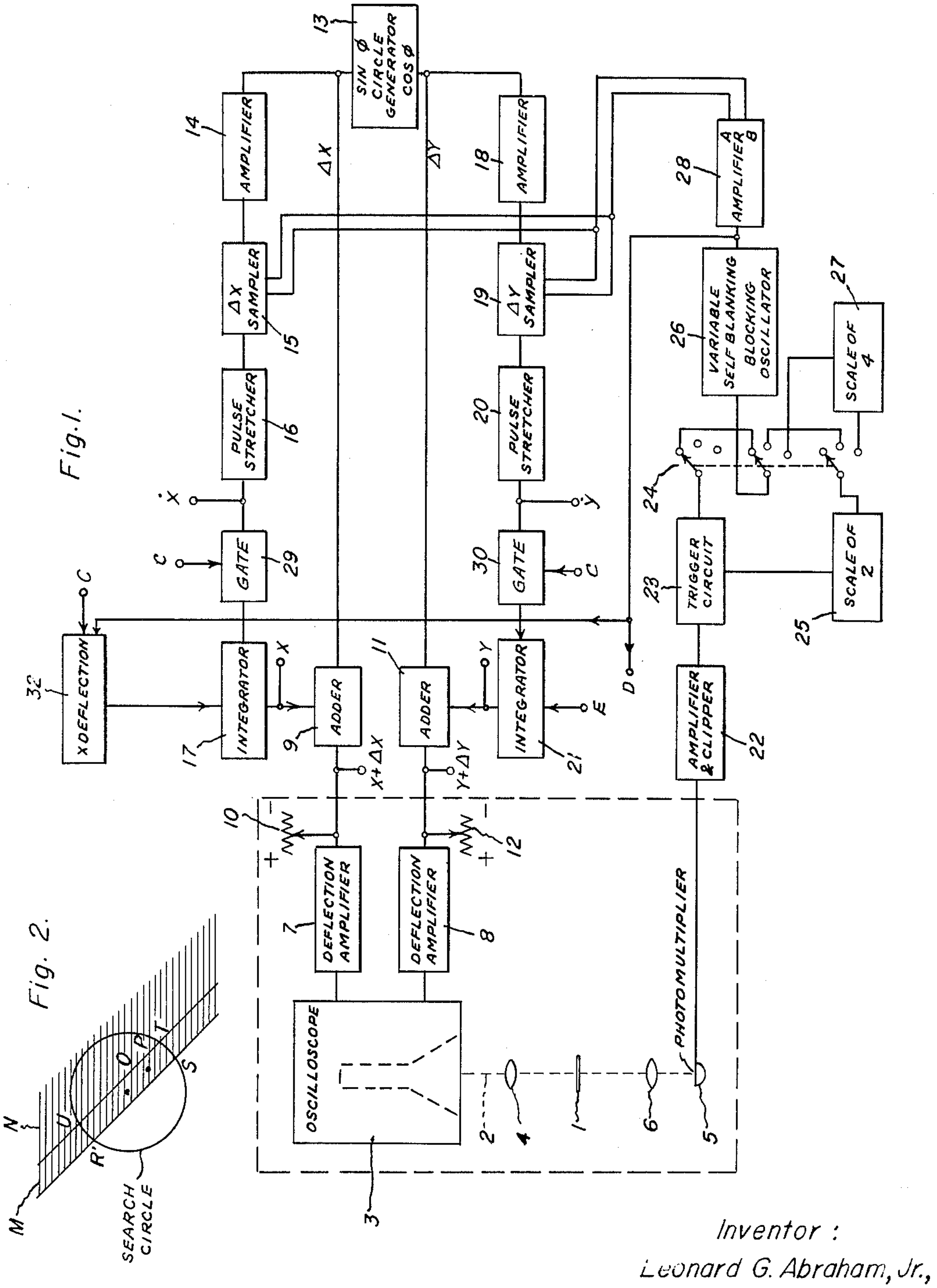
FIG. 1 is a block diagram of an exemplary curve follower which may be employed to trace characters recognized in accordance with the present invention.
FIG. 2 illustrates a search circle trace produced by the FIG. 1 curve follower.
Figures 2A, 2B, 3:
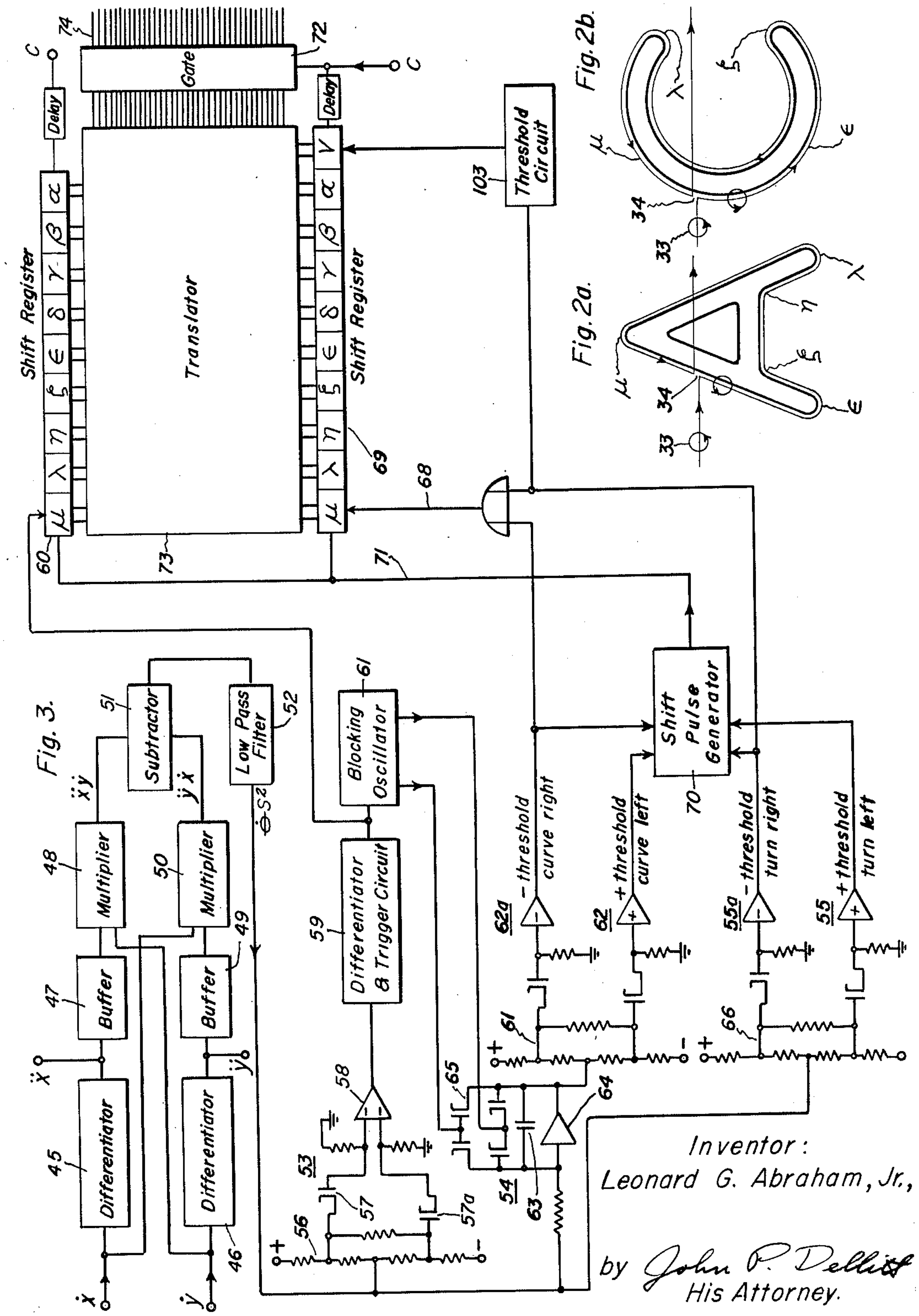
Figures 6, 7:
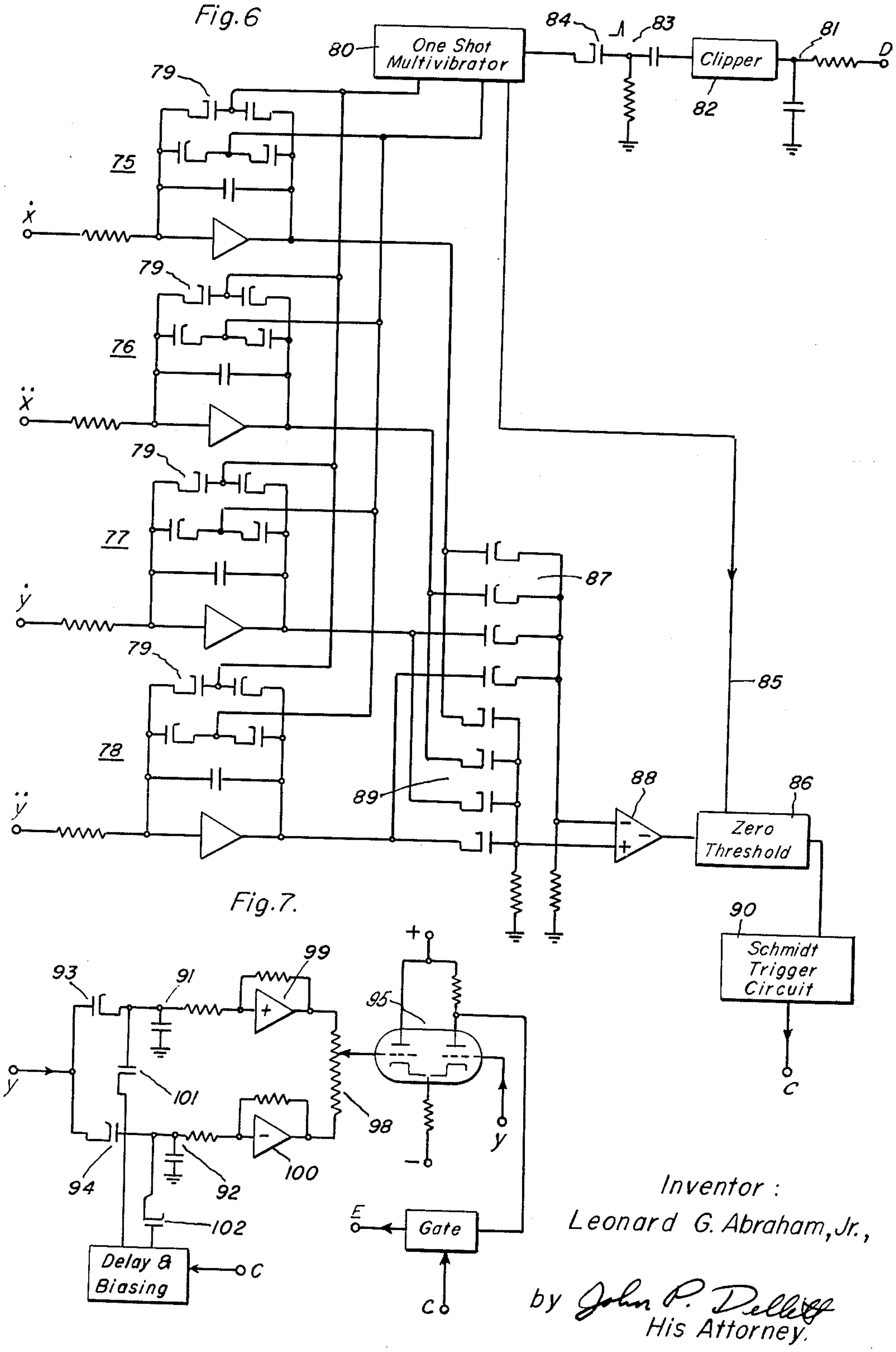

FIGS. 2*a* and 2*b* illustrate search circle traces around alphabetic characters;

FIG. 3 is a schematic block diagram of an embodiment of character recognition circuitry in accordance with the present invention;

FIGS. 4 and 4*a* illustrate schematically internal translational wiring for providing a single electrical output for each letter of the alphabet;

FIG. 5 is a chart illustrating stored electrical definitions for the capital letters of the alphabet, according to the present invention;

FIG. 6 is a schematic diagram of a circuit for detecting the end of a character trace for use in conjunction with the FIG. 1 curve follower, and the FIG. 3 recognition circuitry, and FIG. 7 is a schematic diagram of an exemplary trace re-positioning circuit for use in accordance with the present invention.

In FIG. 1 there is illustrated an apparatus for tracing around curves, definable areas, and the like which is more fully described and claimed in my patent application Serial No. 82,211 (now abandoned), entitled "Pattern Tracer System," assigned to the assignee of the present invention and filed concurrently herewith.

Although other similar devices may be used for following around the outline of a character for recognition purposes in accordance with the present irnvention, the referenced curve following system is particularly advantageously employed in combination with the other aspects of the present invention in that it follows the character smoothly at a relatively constant overall velocity, formulating continuous orthogonal components of velocity for processing in the subseqeunt recognition circuitry. Moreover the trace and tracing information are attained with acceptably high speed.

Referring to FIG. 1, illustrating a curve tracing apparatus, a curve to be traced or a display of characters to be recognized is displayed upon a transparency 1 and has superimposed thereupon a scanning light beam 2 produced by oscilloscope 3 and focused by lens system 4 upon transparency 1. The light from lens 4 that passes through the transparency 1 is focused on photomultiplier 5 by means of lens system 6. The optical system employed is for the purpose of producing a light trace upon the curve to be followed (displayed at 1), and thereupon detecting intersections of the light trace through photomultiplier 5 whose output will change sharply when an intersection occurs. It is apparent, however, that other trace and detection systems could be substituted. For example, any television-type camera tube such as an image orthicon, vidicon, or iconoscope can be utilized as a unitary apparatus producing a trace upon an unknown curve while detecting the intersections therewith. Reflected as well as transmitted light images may be used.

Referring again to FIG. 1, the beam forming oscilloscope 3 is provided with an $x$ deflection amplifier 7 for causing beam 2 to move in a relatively horizontal direction and $y$ deflection amplifier 8 for similarly causing beam 2 to move in a relatively vertical direction. The input for deflection amplifier 7 is derived from adder 9 in conjunction with D.C. reference potentiometer 10. A similar input for deflection amplifier 8 is supplied from adder 11 in conjunction with reference potentiometer 12. Reference potentiometers 10 and 12 would, for example, be set at mid-scale for initial positioning of beam 2 in the center of transparency 1.

Beam 2 is caused to execute a small circular sweep or search circle, the coordinate $\Delta x$ and $\Delta y$ voltages of which are supplied by adders 9 and 11 from a circle generator 13. The circle generator 13 may conveniently comprise an oscillator having a first output represented as sin $\phi$ suppied as an input to adder 9 and a second output represented as cos $\phi$ having a 90° phase shift relation to the first mentioned output and supplied as an input to adder 11. The sin $\phi$ voltage is also coupled in an integration channel through an isolating amplifier 14 to $\Delta x$ sampler 15, arranged to pass or gate the output of amplifier 14 to pulse stretcher 16 only when gating inputs A and B are supplied $\Delta x$ sampler 15. Pulse stretcher 16 stores the sampled output of amplifier 14 from one sampling period until the next. That is, when $\Delta x$ sample 15 is operable to couple the output of amplifier 14 to pulse stretcher 16 for a brief period the value of this output will be stored in pulse stretcher 16 until such time as the output of amplifier 14 is sampled once more, whereupon pulse stretcher 16 will adjust and store a new amplifier 14 output. The output of pulse stretcher 16 is herein designated as $\dot{x}$ or the velocity in the $x$ direction of deflection voltage $x$, the output of integrator 17. The pulse stretcher 16 output drives an integrator 17 which continuously integrates the voltage output $\dot{x}$ of pulse stretcher 16 and supplies this integrated value as an additional input to adder 9.

The channel for adding an integrated signal to the $y$ deflection amplifier is substantially identical to that described for $x$ deflection. Signal output cos $\phi$ of circle generator 13 is amplified through isolating amplifier 18 driving $\Delta y$ sampler 19 whose function is to provide successive inputs to pulse stretcher 20 at such times as gate inputs A and B occur. The output of pulse stretcher 20 is designated $\dot{y}$ and its value is integrated by operation of integrator 21 and then added to the $y$ deflection signal at adder 11.

The function of the just-described integration channels is to move the search circle produced by circle generator 13 in a direction along the curve to be followed. The adder circuits add the stored position of the search circle center $(x, y)$ with the vector representation of the search circle radius.

The search circle sweep is illustrated in FIG. 2, the search circle of center O producing intersections R and S with a solid dark figure M–N or intersections R, S, T and U with a line curve M narrower than the diameter of the search circle.

The curve follower operates such that intersection of the generated search circle with the curve displayed on transparency 1 is detected by photomultiplier 5 in FIG. 1 and the signal produced by the photomultiplier causes the $\Delta x$ and $\Delta y$ coordinates of the circle relative to its own center to be thus added proportionally to the overall $x$ and $y$ deflection voltages at times when such intersection occurs. To produce the desired sampling of the circle generator output, photomultiplier 5 is coupled to amplifier and clipper 22 whose function is to square up the photomultiplier output. This pulse is differentiated in the input circuitry of trigger circuit 23.

Trigger circuit 23 is arranged to produce a square positive output pulse of a preset duration in response to the differentiated input signal and may conveniently comprise a one shot multivibrator or, more particularly, a Schmitt trigger circuit. This positive output pulse is connected to an input arm of a three-position, 3 gang switch 24 and also to a "scale of 2" circuit 25 whose output is in turn connected to another input arm of switch 24. Switch 24 is arranged for selectively providing an input to variable self-blanking blocking oscillator 26 from trigger circuit 23, scale of 2 circuit 25, or a scale of 4 circuit 27. To this end the input drive terminal of blocking oscillator 26 is coupled to a third arm of switch 24 operable in a first position of the switch to select the output of trigger circuit 23, operable in a second position of circuit 24 to select the scale of 2 circuit 25, and operable in a third position to select the output of scale 4 circuit 27. In the third position of the switch 24, scale of 2 circuit 25 drives scale of 4 circuit 27, each of the latter two circuits conveniently comprising a bistable multivibrator which produces a single output for every two input pulses applied thereto. Thus, selected intersections of the search circle with the curve displayed at 1 may produce an input at blocking oscillator 26 or, alternatively, every other or every fourth such crossing may be chosen as an input for the blocking oscillator.

The blocking oscillator 26, the scale of 2 circuit 25 and the scale of 4 circuit 27 are each sensitive to positive going pulses only. Blocking oscillator 26 will operate to produce an output pulse only when photomultiplier 5 detects the transition of light beam 2 from a relatively transparent area on transparency 1 to a dark area on transparency 1. Providing the search circle is smaller in diameter than the width of the curve or solid region being traced, an output pulse will be produced by blocking oscillator 26 for the intersection between the circle and the curve where the circle passes into the opaque area of the curve.

As will be seen, the curve following beam then moves along the curve in the direction of this intersection from the previous center of the search circle. That is, the curve tracer will cause the search circle to move around an intersected curve or figure in a counterclockwise direction, this movement being in addition to the counterclockwise rotation of the search circle itself. The scale of 2 and the scale of 4 circuits are useful for the disregarding of certain such intersections. For example, when the diameter of the search circle is greater than the width of the curve being followed, inclusion of the scale of 2 circuit is one alternative means for insuring travel of the search circle in a consistent direction along the curve. In this regard, reference is again made to FIG. 2 illustrating the search circle traveling along a line curve in a direction from O to P. The scale of 2 circuit will permit the blocking oscillator to be responsive only to the light to dark crossing S or, alternatively, the light to dark crossing U. For moving the search circle in the direction from O to P the light to dark crossing U may be ignored by the scale of 2 circuit while the light to dark crossing S is recognized and applied to blocking oscillator 26. An alternative and preferred means for insuring consistent search circle travel will be subsequently described.

The variable self-blanking blocking oscillator 26 includes input differentiating means responsive to positive input pulses. The oscillator produces a sharp output pulse coincident with the initiation of the received input and this output pulse is applied to amplifier 28. The variable self-blanking blocking oscillator 26 is arranged to have a preset recovery period slightly longer than the time required for the search circle to proceed from a desired light to dark intersection S in FIG. 2 to the undesired light to dark intersection U in FIG. 2. This "self-blanking" period may be altered in accordance with the rotational angular velocity $\phi$ of the search circle such that after each output pulse the blocking oscillator will not recover for a period somewhat greater than the time for the search circle to execute 180° of its rotation. Thus the blocking oscillator may itself be adjusted to be effective in causing the search circle to move along the curve in a consistent direction.

Amplifier 28 operated by the pulse output from blocking oscillator 26 produces low impedance positive and negative outputs A and B in response thereto for application to samplers 15 and 19 whereby the output of circle generator 13 is sampled at the time of intersection between the search circle and the curve being followed; this sample value is then applied to the integrated $x$ and $y$ deflection circuitry as hereinbefore set out.

Gates 29 and 30, and $x$ deflection circuit 32 perform a timing function and their operation will be described in conjunction with character recognition operation.

Briefly, in typical operation of the curve tracer, the circle generator 13 is set at a frequency to produce the desired rotating search circle frequency of light beam 2. When light to dark intersections occur between the search circle and the curve to be followed they cause production of an output spike from blocking oscillator 26. The blocking oscillator produces coincident positive and negative outputs through the medium of amplifier 28 and these outputs gate small samples of the circle generator sine and cosine outputs for application to pulse stretcher circuits 16 and 20, respectively. Pulse stretchers 16 and 20 then store the sampled voltage between intersections which voltage is applied to integrator 17 or 21. The adders to which both search circle deflection signals and integrated deflected signals are applied produce the $x+\Delta x$ and $y+\Delta y$ deflection voltages which cause the search circle to move along the followed curve. The $x$ and $y$ outputs as well as the $\dot{x}$ and $\dot{y}$ outputs are then available for recognition of alpha-numeric characters.

It should be noted that the required signal information is not materially degraded by optical and/or electrical defocusing of the beam 2 forming the search circle. Some defocusing is sometimes desirable in that the trace will be less sensitive to imperfections in printing of alpha-numeric characters and will actually disregard small printing gaps in a character. In such an instance the photomultiplier 5 sees a diffuse crossing and the search circle is moved in a direction representing a rough average of the direction the character boundary takes.

Referring briefly to FIGURES 2$a$ and 2$b$ illustrating the tracing of alphabetic characters, search circle 33 is caused to intersect the character at 34 and trace around the character in a counterclockwise direction. Upon completion of the trace to starting point 34, deflection circuitry in one embodiment of the invention causes the search circle to move across the character to seek an intersection with the next character to be recognized. While the search circle is tracing around each character, certain signals, namely, $\dot{x}$ and $\dot{y}$ are derived from the FIGURE 1 curve tracer which are further employed to produce a signal indicative of the changes in tracing direction around the character, and which latter signal is uniquely recognized for identification of the character. Circuitry for producing the latter signal and conveniently deriving the unique information therefrom, is further described in connection with FIGURE 3.

Referring to FIG. 3, the aforementioned $\dot{x}$ voltage is provided as an input to differentiator 45 and the voltage $\dot{y}$ is similarly coupled to the differentiator 46, these differentiators conveniently comprising an R-C or an operational amplifier-type differentiator. As will be appreciated, the output of differentiator 45 is $\ddot{x}$, the time rate of change of $\dot{x}$, while the output of differentiator 46 is $\ddot{y}$, the time rate of change of $\dot{y}$. The voltage $\ddot{x}$ is applied through a buffer amplifier 47 to one input of a four-quadrant multiplier 48, receiving as another input thereof the signal voltage $\dot{y}$. Similarly the voltage $\ddot{y}$ is coupled through buffer amplifier 49 to one input of four-quadrant multiplier 50 having its remaining input coupled to receive the signal voltage $\dot{x}$.

Multipliers 48 and 50 are each an analog type of multiplier designed to produce the analog product of two input voltages with due regard to the polarity of each of said input voltages. Thus if both input voltages are of the same sign, a positive product will be delivered as an output, while if of different sign, a negative product is the result. Each such multiplier may comprise a plurality of individual analog multipliers arranged through gating means to handle the various possible polarity combinations, or a four-quadrant multiplier may be conveniently obtained commercially, for example, a duplex multiplier, Model MU/DV, available from Philbrick Researches, Inc., Boston, Massachusetts, is suitable.

The output of multiplier 48 is subtracted from the output of multiplier 50 in a subtractor device 51 to produce a voltage proportional to $$\ddot{y}\dot{x}-\ddot{x}\dot{y}$$

In subtractor device 51, the signal $\ddot{x}\dot{y}$ may be conveniently changed in sign and added to the signal $\ddot{y}\dot{x}$ with conventional analog adder means. The voltage produced by the subtractor device 51 is then coupled through a low pass filter 52, designed to remove excessive noise in the analog output.

The FIGURE 3 circuitry thus far set out operates according to the following formula for $\dot{\theta}$, proportional to the angular rate of change in overall consistent tracing direction taken by the center of the search circle in passing around a character:

$$\dot{\theta}=\frac{\ddot{y}\dot{x}-\ddot{x}\dot{y}}{s^2}$$

where $$s^2=\dot{x}^2+\dot{y}^2=|v|^2$$

or the absolute value of the search circle center velocity squared.

In accordance with the operation of the present circuitry, $s^2$ has a constant or relatively constant value so that the product $\dot{\theta}s^2$ is proportional to $\dot{\theta}$.

The output $\dot{\theta}s^2$ of low pass filter 52 is applied as an input to dual threshold circuit 53, integrator 54, to positive threshold circuit 55 and to negative threshold circuit 55$a$. The input terminal of dual threshold circuit 53 is the approximate center tap of a voltage divider network 56 disposed between a positive and negative voltage. A diode 57 oriented to pass current in a negative direction from the divider is connected at a selected threshold point between the center tap and the positive voltage end of the divider, its plate being coupled to a negative input terminal of a dual amplifier 58. Similarly, a diode 57$a$ disposed for passing current in a positive direction from the voltage divider network is connected at a point between the center tap thereof and the negative voltage end, the cathode of the diode being coupled to a positive input of dual amplifier 58. Amplifier 58 is arranged to produce a positive output upon either reception of a positive input at its positive input terminal or negative input at its negative input terminal. Thus if the input $\theta s^2$ exceeds a certain negative voltage set by the positive connection of diode 57 on the voltage divider network, a positive output from amplifier 58 will result. Similarly, if the signal $\theta s^2$ exceeds a certain positive threshold as determined by the negative voltage connection of diode 57*a* on the voltage divider network, a positive output from amplifier 58 will also result.

As will hereinafter become more apparent, diodes 57 and 57*a* are adjusted relative to the voltage divider such that $\theta s^2$ produces an indication of a vertex or corner in the alpha-numeric character before a signal output from amplifier 58 results. Amplifier 58 drives a differentiator and trigger circuit 59 responsive to the said output for producing a pulse of predetermined length which is supplied as an input of shift register 60, and as an input to blocking oscillator 61. The apparatus designated 59 may conveniently comprise a Schmitt trigger circuit with an RC differentiating coupling at the input thereof. Then, if the signal $\theta s^2$ exceeds a predetermined value, as recognized in dual directional circuit 53, and has a steep enough slope to operate the Schmitt trigger then the curve tracer will be considered to have encountered a vertex or sharp discontinuity such as a corner between line segments in the alpha-numeric character being traced. The threshold circuit 53 may be adjusted in actual practice to only recognize such vertices. Such indication is entered as a pulse input to shift register 60.

Integrator 54, conveniently comprising a Miller-type integrating circuit, also receives signal $\theta s^2$ and provides its integrated output to the combined input voltage divider circuitry 61 for positive threshold circuit 62 and negative threshold circuit 62*a*. Integrator 54 includes a capacitor 63 across operational amplifier 64 and further includes a clamping network 65 disposed across capacitor 63 and receiving positive and negative inputs upon the operation of blocking oscillator 61 in such a manner that blocking oscillator operation acts to drop the integrated voltage across capacitor 63 to zero. The clamping network 65 is a diode bridge, the diodes of which are ordinarily back-biased through means included in blocking oscillator 61, operative in the absence of an output therefrom. A pulse output from blocking oscillator 61, indicative of a vertex in the character being traced will then short out or disable integrator 54, re-establishing its integrated output at a zero voltage level. However, a slowly changing input applied to integrator 54, whose change has been insufficient in value to register a vertex threshold at dual threshold circuit 53, will be gradually integrated and will remain unshorted by clamping network 65. When the integrator voltage reaches a preset positive voltage, as predetermined by threshold voltage divider circuitry 61, the positive threshold circuit 62 delivers an output. Alternatively, if the output of integrator 54 reaches a preset negative value, as also predetermined by the setting of voltage divider circuitry 61, negative threshold circuit 62*a* delivers an output.

It will be appreciated then that a change in $\theta$ insufficient to indicate a vertex in the character being traced but nonetheless indicating a sustained or somewhat continuous changes in the direction of trace will produce a positive output from threshold circuit 62 or a negative output from threshold circuits 62*a*, according to whether such change in direction has been positive or negative. If the direction taken by the trace relatively constantly changes to the left between vertices of the character, threshold circuit 62 will be activated to produce an output. If the direction of the trace relatively constantly changes to the right, circuit 62*a* will be activated to produce an output. However, a relatively constant positive change in angular direction of trace indicates a curve to the left in the character being traced while a relatively constant negative angular change between vertices indicates a curve to the right in the character being traced. Therefore, the output of circuit 62 establishes a curve left in the character and the output of circuit 62*a* establishes a curve right in the character. Upon the next encounter of the trace with a corner or vertex in the figure, however, dual threshold 53 will activate blocking oscillator 61 to preset the integrator 54 and enable it to again test the character for a curve right or a curve left feature.

Signal voltage $\theta s^2$ from low pass filter 52 also is applied as an input voltage divider circuitry 66 associated with positive and negative threshold circuits 55 and 55*a*. The voltage divider circuitry 66 is set in similar manner to voltage divider circuitry 56 so that activation of the positive input of positive threshold circuit 55 indicates a vertex or sharp angular change in $\theta$, the angular tracing direction around the figure, while activation of the negative input of threshold circuit 55*a* similarly also indicates a vertex in the figure. Here unlike in dual threshold circuit 53, the positive and negative detection is separated in two separate threshold amplifiers such that an appropriate positive output signal is given by one or the other amplifier depending upon the direction of the sharp change in $\theta$. Thus, if the tracing direction turns sharply to the left, a positive output will be produced by threshold circuit 55 while a sharp change in the tracing direction to the right causes a positive output to be present in threshold circuit 55*a*.

The outputs of threshold circuits 55*a* and 62*a* are applied to an or-gate 67 which may conveniently be of the conventional diode-type, and which upon the activation of either input thereof, will cause a voltage to appear on lead 68 connected as an input to shift register 69. Then, either in the event that the letter segment being traced turned right from a vertex as indicated by threshold circuit 55*a* or curved right between vertices as indicated by threshold circuit 62*a*, an input will be entered into shift register 69.

Threshold circuits 55, 55*a*, 62 and 62*a* also act to trigger a shift pulse generator 70 which then provides a pulse on lead 71 coupled to each shift register for advancing the information in each of the shift registers simultaneously to the right. Therefore, if either a vertex or a curved portion between vertices is encountered in tracing the unknown character, information will be entered in shift register 60.

Shift register 60 has registered whether a vertex or a curved segment was encountered and shift register 69 indicates whether the character turned left or right at the curve or vertex. Each time a bit of information is registered, previous information moves to the right in the registers. The information in each shift register may be considered as being in the form of a binary code. Thus, a pulse or binary "one" is entered into shift register 60 each time a vertex occurs. However, information in shift register 60 is shifted one place to the right whether a vertex or a curve is detected. An absence of the pulse stored in the shift register position will then be indicative of a curved letter section corresponding to that position. A pulse or binary "one" is entered into shift register 69 each time the letter goes right whether it be at a vertex or at a curved section of the character being examined. But, information will be shifted to the right in this shift register by an appropriate output pulse from shift pulse generator 70 whenever a vertex or curve is encountered, no matter which direction it may take. Lack of a stored pulse in a position shift register 69 then must be indicative of either a turn left or a curve left. It is now apparent that at the conclusion of a character trace, an electrical version of each geometric portion of the character will be stored in shift registers 60 and 69. Corresponding positions of each shift register will together present a quaternary code defining each successive character element and are indicative of whether such element is a turn or curve left or right and whether a vertex is being considered or whether the directional information pertains to a curved portion between vertices. Successive vertex entries in the shift registers, in the absence of an indication of a curve therebetween, indicate the appearance of a straight-line segment.

At the end of a character trace, an end of character signal C is applied to gate 72 by means to be described and this gate passes information from a translator 73 to a series of output leads 74 each representative of a separate character or letter in the system being used. Translator 73 may conveniently comprise a gating matrix producing an output on one of a plurality of output leads in accordance with separate and distinct combinations of information contained in shift registers 60 and 69. Translator 73 may, for example, comprise a plurality of gates, each operative upon different unique patterns stored in shift registers 60 and 69 at the ends of the trace. Alternatively, shift registers 60 and 69 may have their parallel outputs wired directly to output gate 72 without the necessity of an intervening translator 73, whereupon each character appears in its own unique coding according to its own geometry on output lead 74 for further processing in this fashion. After appearance of an output on lead 74 shift registers 60 and 69 are cleared by means of a delayed end of character pulse "C."

Referring to FIG. 4 illustrating shift registers 60 and 69 in greater detail, the shift register 60 is conventionally formed of a plurality of cascaded flip-flop stages 35 and includes certain other conventional circuitry (not shown) for simultaneously advancing the status of each flip-flop to the next upon receipt of a shift pulse from shift pulse generator 70 in FIG. 3. Each of the stages 35 provides a pair of positive outputs 36 and 37, the former indicative of a stored pulse or binary "one" and the latter indicative of a binary "zero." The stages of the shift register are herein designated by the Greek letters $\alpha$, $\beta$, $\gamma$, $\delta$, $\epsilon$, $\zeta$, $\eta$, $\lambda$, $\mu$. It will be appreciated that stage $\alpha$, after the receipt of nine shift pulses will contain the first bit of information entered into the register and stage $\mu$ will contain the last.

Shift register 69 is composed of a plurality of similarly designated stages where flip-flops 38 each providing positive outputs 39 and 40, the former indicative of a binary "one" stored and the latter indicative of a binary coupled to the translator 73 which may be employed for converting the binary outputs from the two shift registers into single outputs for indicating a particular character recognized. FIG. 4 illustrates one possible form of translation circuitry here showing recognition of the dual binary or quarternary information synonomous with the letter A. An "and" gate 41 receives certain selected outputs from the shift registers 60 and 69 upon the conclusion of a character trace and tests these outputs for presence of the letter A. "And" gate 41 may conveniently comprise a conventional diode gating circuit wherein simultaneous occurrence of all inputs are necessary to energize lead 42.

Reference to FIG. 5 opposite the letter A indicates the binary sequences stored in the shift registers 69 and 60, respectively, which will be indicative of the letter A. Employing the shift register positions $\mu$ through $\delta$ for a unique definition of the A after five shift pulses, it will be seen that shift register 60 will contain the binary representation 111110 while shift register 69 will contain the similar representation 001100. Employment of six positions for this recognition instead of five differentiates the A from the E, for example. The trace sequence giving rise to the particular shift register sequence is illustrated by vertices $\epsilon$ through $\mu$ in FIG. 2*a*.

FIG. 4*a* illustrates an example of a possible translator hookup for recognizing the letter C, wherein "and" gate 43 selects the proper inputs from shift registers 60 and 69, according to the FIG. 5 chart, and produces an output indicative of C on output lead 44.

Greek letters $\epsilon$ through $\mu$ in FIG. 2*b* indicate the curved portions and vertices giving rise to the pulse pattern for the letter C in the chart in FIG. 5.

Shift register 69 includes an additional position, V, at the right-hand end, employed for differentiating between the geometrically similar capital L and capital V. A threshold detector 103 receiving its input from right-turn-threshold circuit **55*a*, is set to enter a pulse into the shift register when the output of circuit 55*a* attains a predetermined level. This detected level is adjusted such that a rapid right turn of over 90° at a traced character vertex, is required to operate circuit 103**. Such a right turning angle of over 90° occurs at the inside bottom of the V but does not occur in the L. The "and" gate employed for producing a signal corresponding to the capital V then receives a "one" output from shift register stage V as a prerequisite to its producing an indication. The "and" gate corresponding to the L receives the "zero" output from stage V. The L and V "and" gates receive their other operating inputs from appropriate outputs of shift register stages $\mu$, $\lambda$, $\eta$, and $\zeta$, in accordance with the FIG. 5 chart.

Other wiring arrangements for the translator for recognizing particular characters will occur to those skilled in the art. The arrangements given above are by way of example only and do not necessarily comprise an exhaustive treatment for economizing the circuitry of the translator. However, similar gating circuits may be formed, responsive to each of the unique dual binary or quaternary shift register representations of the capital letters indicated in the FIG. 5 chart.

FIGS. 6 and 7 illustrate circuitry for consecutively moving the curve trace from one character to the next character along a generally horizontal display of characters herein described as being displayed on transparency 1. The FIGURE 6 circuitry detects the end of each character trace and in conjunction with the FIG. 1 curve follower causes the curve follower to move immediately to the next character in a line of characters. Inputs $\dot{x}$, $\ddot{x}$, $\dot{y}$, $\ddot{y}$, derived from the FIGS. 1 and 3 circuitry, are respectively applied to integrators 75, 76, 77 and 78, each of said integrators being similar to integrator circuit 54 hereinbefore described and including in each instance a clamping network 79 arranged for concluding the voltage stored in each integrator pursuant to an external clamping signal. It should be observed at this point that the integral of each of the last four mentioned quantities will be zero at the time the tracing returns to the initial point at which the beam encountered the character, providing, however, that each of the integrators is set to zero immediately after such character is encountered by the tracing beam, indicated by reference numeral 34 in FIGS. 2*a* and 2*b*. For example, the operation of integrators 75 and 76 may be represented by the following formulae:

$$x(t_1)-x(t_0)=\int_{t_0}^{t_1}\dot{x}(z)\,dz$$

and $$\dot{x}(t_1)-\dot{x}(t_0)=\int_{t_0}^{t_1}\ddot{x}(z)\,dz$$

The initial value of each of the above equations is zero and their value will return to zero at the end of a character trace. In the circuitry of FIG. 6 the initial zero setting is provided by applying a clamping signal from a one-shot multivibrator 80 for causing each of the clamping networks 79 to short out the respective integrator capacitors. One-shot multivibrator 80 fires and produces this pulse when the signal D from blocking oscillator 26 (in FIG. 1) indicates the initial encounter of the trace with a character. This signal D is integrated by circuit 81, squared up by clipper 82, differentiated in circuit 83 and applied to one-shot multivibrator 80 through a diode 84 arranged to allow triggering of the multivibrator when the trace first acquires the character. Multivibrator 80 also provides an output signal on lead 85 which disables zero threshold circuit 86 during this period, for example, by clamping the input thereof. Thereafter each of the integrators will proceed to accumulate their respective functions but all will not return to substantially zero until the trace has returned to point 34 in FIGS. 2*a* or 2*b*. After initial encounter of the character, integrating circuit 81 charges up to avoid retriggering multivibrator 80.

A series of diodes 87 are poled to pass a positive signal from any of the integrators to bias the negative input of amplifier 88 while a second series of diodes 89 are poled to apply negative outputs from respective integrators to bias positive inputs of amplifier 88. Amplifier 88 is arranged with the usual 180° phase shift and such that the presence of a bias on either input will prevent the output thereof from dropping in voltage level. Therefore, if any of the integrators 75 through 78 present an integrated signal other than zero, an output other than zero will be produced by amplifier 88. However, when all the integrators reach the zero value at the end of the trace, the output of amplifier 88 will drop to substantially zero and such drop will be detected by zero threshold circuit 86 (in the absence of a disabling signal on lead 85) and the zero threshold circuit will then cause Schmidt trigger circuit 90 to produce an output pulse "C" of a predetermined duration indicating the end of a character trace. Moreover, Schmitt trigger circuit 90 is arranged to have a period comparable to the time required for moving tracing beam 2 across the just-traced character to a position for intercepting the next character in a horizontal row. For this purpose, the output "C" is connected to apply a steady voltage to integrator 17 in FIG. 1 by means of *x*-deflection circuit 32 (in FIG. 1). X-deflection circuit 32 has a time constant such that it is insensitive to being triggered into an "off" condition by a second input "D" for a predetermined adjustable period necessary for the light beam 2 to traverse the character just detected. Thereafter, however, interception of a new character by beam 2 will cause a photomultiplier 5 to operate blocking oscillator 26 producing a pulse "D" returning *x*-deflection circuit 32 to its original or "off" condition. Thereupon tracing will proceed around the next character in a counterclockwise direction.

It is sometimes possible for the beam 2 to become misoriented during the traversal of a horizontal line of print as between the top and bottom of the characters being intercepted. It is desired that the beam intersect each character from the left and in the upper third thereof to avoid, for example, a discrepancy resulting from hitting the bottom portion of a capital "J". Therefore, means are provided for repositioning the beam Z in a vertical direction after the trace of each character. To this end, the vertical deflection value "*y*" (from FIG. 1) is applied to integrating capacitors 91 and 92 through oppositely poled diodes 93 and 94 in FIG. 7. During the trace of a character, maximum positive and negative vertical deflection values will be stored on these capacitors. Differential amplifier 95 has applied to one input thereof a value chosen between a maximum positive and negative value of the character just traced by coupling this input to a potentiometer 98, interpositioned between the outputs of amplifiers 99 and 100, the inputs for these amplifiers being derived from capacitors 91 and 92, respectively; therefore potentiometer 98 is adjustable to secure one input to the differential amplifier at a selected deflection voltage between the maximum end points of the character just traced. The other input to the differential amplifier is the value of *y* (considered at the end of the character traced). The output E, when passed through gate 96 in accordance with signal "C", will then be the difference between the actual "*y*" deflection voltage at the end of the trace and the value which this deflection ought to have at the end of the trace to properly intersect the next character. This difference E is applied to "*y*" integrator 21 in FIG. 1 and acts to adjust the deflection of beam 2 in a direction to correct major deviations from the preferred intersection of the light beam 2 with the next character. A delayed version of end of trace pulse "C" discharges capacitors 91 and 92 through diodes 101 and 102, respectively.

While I have shown and described several embodiments of my invention, it will be apparent to those skilled in the art that many changes and modifications may be made without departing from my invention in its broader aspects; and I therefore, intend the appended claims to cover all such changes and modifications as fall within the true spirit and scope of my invention.

What I claim as new and desire to secure by Letters Patent of the United States is:

1. Character recognition apparatus for providing an output indicative of interconnecting geometric segments from which a character is composed comprising means generating signals responsive directly to and indicative of the turning direction of said segments relative to a prior connecting portion of said character irrespective of the actual direction after turning, means for detecting the curvature of said segments, and storage means for storing an electrical sequence derived directly from said signals indicative of the relative direction of said segments and their curvature to uniquely identify each said character.

2. Apparatus for describing the electrical outline of a character comprising means for successively recognizing the successive interconnecting segments of said character in the order they appear in the character outline, detection means for determining the direction of said segments relative only to the previously detected segment along the character and generating an output indicative of said direction, and further means responsive to the curvature of said segments for generating an output indicative of the direction of said curvature upon the occurrence of predetermined curvature, said last two mentioned outputs together uniquely electrically defining said character according to its own geometric shape.

3. Character recognition apparatus comprising detection means for determining in a predetermined sequence each of the vertex and curve elements from which a character is made up irrespective of the character's physical orientation, storage means directly retaining these unique characteristics of each said element and translation apparatus for providing separate outputs for each character detected in accordance with its differing combination of geometric elements and completely representative of the character recognized.

4. Character recognition apparatus comprising transducer means for sequentially detecting the various segments from which a character is made up including the vertices between said segments, detection means responsive to the turning direction of a geometric element proceeding from a vertex relative to the previously detected geometric element leading to the said vertex and further means for determining a preselected degree of curvature and curvature direction of said elements for uniquely determining the elements in combination with the directions thereof to thereby separate the recognition of one character from another according to their inherent geometry.

5. A character recognition device comprising apparatus for tracing completely around the exterior of each said character and providing an output representative of the degree of the angular rate of change of said sweep, means responsive to a high angular rate of change in said sweep to generate a signal indicating a vertex in said character as well as the direction said character takes subsequent to a vertex, further detection means distinguishing a slower angular rate of change of said sweep of said character for generating a signal indicating curvature and direction of curvature between vertices so that each character is electrically defined according to its own geometry and means for storing these successive signals whereby to store a unique representation of said character.

6. A character recognition apparatus comprising a curve tracing means for tracing around each character to be recognized and developing a signal representative of said character in a consistent set of coordinates, analog computing means producing a signal proportional to the angular rate of change taken by said character tracing as determined by said curve tracing means, and detection means responsive to said signal from said analog computing means uniquely establishing said character through electrically defining the segments of said character, the direction of said segments and the curvature of said segments.

7. Character recognition apparatus comprising a character tracing device successively superposing said character with a known curve consistently moving with respect to said character in a consistent direction between successive intersections therewith and for producing consistent rate of change components of said movement between intersections, circuit means for differentiating said rate of change components to produce differentiated values thereof, analog computing apparatus cross multiplying said rate of change components and said differentiated values and for subtracting one said product from the other to produce a signal proportional to the angular rate of change of said character trace; a first threshold device for detecting a large rate of change in said signal thereby indicating a vertex in said character being traced; a second threshold device sensitive only to lesser angular rates of change in said character trace for indicating a curved section in said character; and storage means for registering the said vertex and curve information together with the polarity thereof during a complete character scan.

8. Character recognition apparatus comprising a curve follower for tracing around a character to be recognized and producing a substantially continuous representation of the coordinate rates of change of said character around said trace, circuit means for differentiating said rate of change components to produce differentiated values thereof, analog computing apparatus cross multiplying said rate of change components and said differentiated values and for subtracting one said product from the other to produce a signal proportional to the angular rate of change of said character trace; a first threshold device for detecting a large rate of change in said signal thereby indicating a vertex in said character being traced; a second threshold device sensitive only to lesser angular rates of change in said character trace for indicating a curved section in said character; and storage means for registering the said vertex and curve information together with the polarity thereof during a complete character scan.

9. Character recognition apparatus comprising character tracing means including circuitry for detecting the angular rate of change of the character being traced during the trace thereof, a first threshold detector responsive to large angular rates of change to indicate vertices in the character being traced; a second threshold detector indicating lesser angular rates of change in the character being traced; and memory apparatus for storing such information during a complete character trace.

10. The apparatus as set forth in claim 9 further including circuitry for concluding the trace of a character after a predetermined trace thereof and then detecting for tracing purposes the next of a series of characters.

11. Character recognition apparatus comprising a character tracing means for tracing around each of a series of characters and producing derivatives of components of the trace, apparatus for integrating said derivative components for determining the return of character trace to the starting point thereof, and means responsive to such integration for diverting the curve tracing means to the next character in the sequence to be traced.

12. The apparatus as set forth in claim 11 further including positive and negative vertical trace detectors producing a predetermined proportional component of the vertical trace component for correcting the vertical deflection of said curve tracing means so that said curve tracing means will properly intersect the next of a series of characters to be traced.

References Cited by the Examiner

UNITED STATES PATENTS

| | | | |
|---|---|---|---|
| 2,980,332 | 4/61 | Brouillette et al. | 340—149 |
| 2,983,822 | 5/61 | Brouillette | 340—149 |
| 2,986,643 | 5/61 | Brouillette | 340—149 |
| 3,015,730 | 1/62 | Johnson | 340—149 |

FOREIGN PATENTS

| | | |
|---|---|---|
| 229,622 | 10/58 | Australia. |

MALCOLM A. MORRISON, *Primary Examiner.*

NEIL C. READ, *Examiner.*